No. 881,449. PATENTED MAR. 10, 1908.

G. A. SMITH.

THREAD CUTTING DEVICE.

APPLICATION FILED JAN. 25, 1907.

Witnesses.
R.C. Dahlberg.
J. B. Smutney.

Inventor.
G. A. Smith.
by Orwig & Lane Atty's

THE NORRIS PETERS CO., WASHINGTON, D. C.

UNITED STATES PATENT OFFICE.

GUSTAVUS A. SMITH, OF MARSHALLTOWN, IOWA.

THREAD-CUTTING DEVICE.

No. 881,449. Specification of Letters Patent. Patented March 10, 1908.

Application filed January 25, 1907. Serial No. 354,060.

*To all whom it may concern:*

Be it known that I, GUSTAVUS A. SMITH, a citizen of the United States, residing at Marshalltown, in the county of Marshall and State of Iowa, have invented a certain new and useful Thread-Cutting Device, of which the following is a specification.

My invention relates to thread cutting devices, and consists in the peculiar and advantageous construction hereinafter described and claimed.

Figure 1:
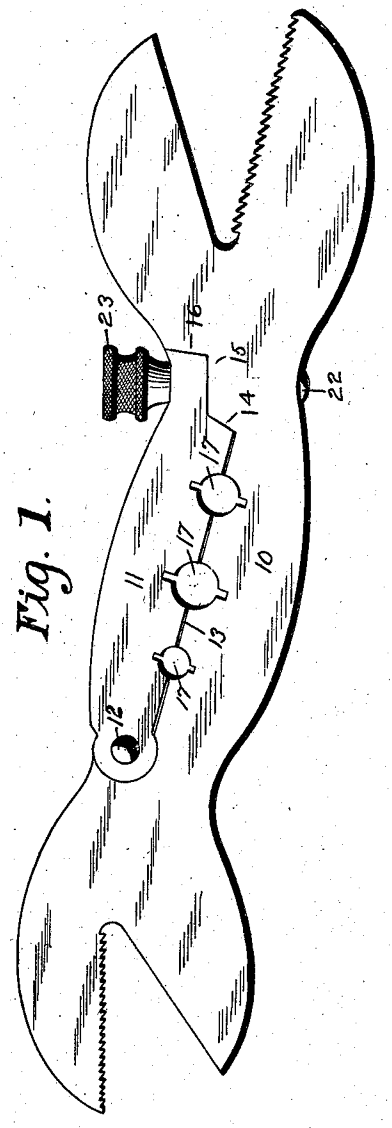
Figure 2:
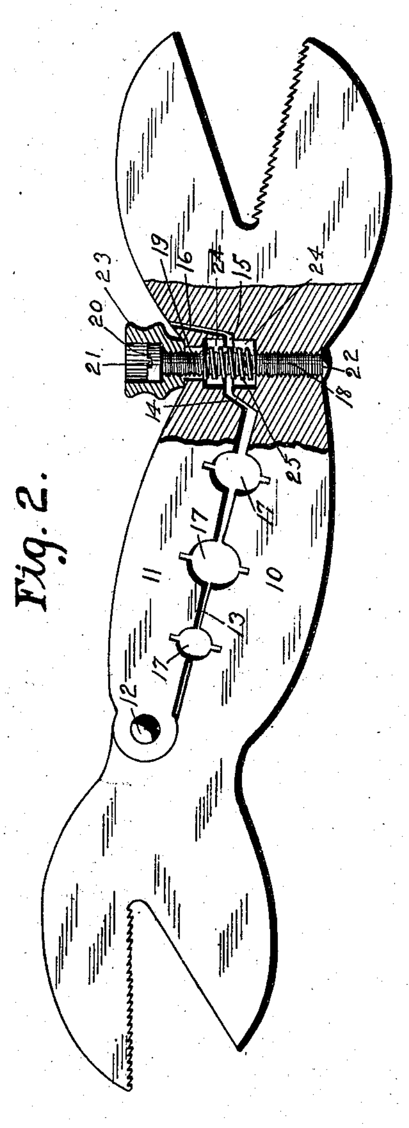

In the drawings which form part hereof: Figure 1 is a side elevation of a combination tool embodying my novel thread cutting device. Fig. 2 shows a similar view with the movable handle member slightly separated from the stationary one and a part of the combination tool broken away to show the construction of the adjusting device.

Referring to the accompanying drawings, I have used the reference numeral 10 to indicate the body of the stationary handle member and 11 to indicate the body of the movable handle member. The latter is pivoted to the former by means of the pivot pin 12 and the line of division of the two handle members is arranged on a straight line 13 at about the longitudinal center of the handle. Near one end of the movable handle member, the division line extends toward the outer edge of the movable handle member at 14 and then substantially parallel with the division line 13 at the point marked 15 and then toward the edge of the tool at the point marked 16. Between the edges of the body portions 10 and 11, I have formed the thread cutting dies 17. When the handle members are together, as shown in Fig. 1, the outer edges of the handle are of such shape as to be conveniently and easily grasped by an operator so that he may use the tool on either end of the handle. In the accompanying illustration, I have shown an alligator wrench of the ordinary type on each end of the handle, other tools may be substituted, if desired, the wrench itself forming no part of my present invention. I also desire it understood that appurtenances of all kinds may be omitted from the ends of the major portion or member of the body of the device without affecting my invention.

I have provided for adjusting the movable handle member relative to the stationary one as follows: The numeral 18 indicates a screw extended through a relatively large opening 19 in the movable handle member and through a screw threaded opening in the stationary handle member. The screw is provided with a head 20 provided with a notch 21 to receive a screw driver. The said screw is first seated in the screw threaded opening of the stationary handle member and then its end that projects beyond the edge of the stationary handle member is upset or riveted at 22 to thereby firmly hold the screw in position and against rotation.

Mounted upon the screw is a nut 23 having a central opening to receive the screw head 20 and having a screw threaded portion below the opening to engage the threads on the screw. Obviously by turning the nut 23, the movable handle member may be forced toward and into engagement with the stationary handle member and by turning the nut in the opposite direction the movable handle member will be permitted to separate from the stationary one to the position shown in Fig. 2. However, the nut 23 cannot be removed from the screw and no part of the screw may project beyond the nut so that there are no rough places or projecting bolts that might in any way interfere with the use of the tool by the operator. I have also provided for moving the movable handle member away from the stationary one when the nut 23 is unscrewed as follows: Formed in the adjacent portions of the handle members surrounding the screw 18 are the cylindrical recesses 24 and mounted on the screw within said recesses is the extensible coil spring 25 with its ends designed to bear in opposite directions upon the handle members.

In practical use, the parts are assembled as follows: The movable handle member is first pivotally connected with the stationary one, then the screw 18 is first passed through the nut 23, then through the opening in the movable handle member and it is screwed into the opening in the stationary handle member by means of a screw driver until the end of the screw projects slightly beyond the edge of the stationary handle member. Then this end is upset or riveted, thus firmly holding the screw against movement. The spring is placed in its recess before the screw is inserted and the screw is passed through it. When the nut is screwed down tight in the position, shown in Fig. 1, the tool may readily be grasped by the handle portion and used for any of the purposes for which it is intended and there will be no projecting bolts or other devices that would at all interfere with the operator's hand and furthermore none of the parts of the device can possibly become detached or lost. Then when it is desired to use the device as a thread cutter, a slight adjustment of the nut is sufficient to separate the stationary and movable handle members to the position desired.

It will be noticed by reference to Fig. 2 that the swinging end of the movable body member 11 is opposed to a lateral enlargement at one end of the main body member 10 at one side of the opposed spring-receiving recesses in the members, and that a shoulder or member 11 is opposed to a shoulder on member 10 at the opposite side of said spring-receiving recesses. This is advantageous since it breaks the joint between the swinging end of member 11 and the member 10 and in that way contributes to the strengh of the device; and it is also advantageous because it assures proper registration of the die recesses in the inner edges of the body members and in combination with the hinge connection 12 precludes the imposition of lateral strain on the screw 18. It is further advantageous because it assures proper registration of the spring-receiving recesses in the members, and effectually avoids any lateral bending or deflection of the spring and consequent impairment thereof.

Having thus described my invention, what I claim and desire to secure by Letters Patent of the United States, therefor is—

1. A thread cutting device comprising a body member having a die-recess in its inner edge and also having a cylindrical recess in said edge, a second body member hinged to the first mentioned member and having a die-recess in its inner edge and also having a cylindrical recess in said edge, a screw fixed to the first mentioned body member and extending through the cylindrical recesses and loosely through an opening in the second mentioned member and having a head at its outer end, a nut mounted on the screw, at the inner side of the head thereof, and having a recess receiving the head of the screw, and a coiled spring arranged in the cylindrical recesses of the members and surrounding the screw and serving to hold the bottom of the recess in the nut against the head of the screw.

2. A thread cutting device comprising body members pivotally connected together and having a thread-cutting die formed in their adjacent edges, a screw fixedly connected to one body member and extending loosely through the other body member and having a head at its outer end, and a nut mounted on the screw, at the inner side of the head thereof, and having a recess receiving the head of the screw; the screw, the nut and the body member adjacent to the nut being so relatively arranged that the head of the screw is contained at all times in the recess of its nut.

Des Moines, Iowa, January 18, 1907.

GUSTAVUS A. SMITH.

Witnesses:

S. F. Christy,

Ralph Orwig.